Jan. 23, 1934.  J. BIJUR  1,944,164

CHASSIS LUBRICATING OIL AND METHOD FOR TESTING THE SAME

Filed Dec. 14, 1928

INVENTOR
*Joseph Bijur*
BY
*Dean, Fairbank, Obright & Hirsch*
his ATTORNEYS.

Patented Jan. 23, 1934

1,944,164

UNITED STATES PATENT OFFICE 1,944,164

CHASSIS LUBRICATING OIL AND METHOD FOR TESTING THE SAME

Joseph Bijur, New York, N. Y., assignor to Auto Research Corporation, a corporation of Delaware Application December 14, 1928
Serial No. 326,042

3 Claims. (Cl. 87—9)

The convenience of supplying a lubricant to most or all of the bearings of any machine, particularly of an automobile chassis, from a single central source is manifest, rather than separately to lubricate each bearing by a distinct manual operation.

For such centralized lubrication, grease has many disadvantages. It is of itself not an ideal lubricant. It hardens at low temperatures and requires a relatively high pressure to propel it to the bearings. The soap content of many greases has a tendency to separate out and, in conjunction with dirt, to form a cement-like material that clogs the oil passages. Grease, moreover, is not sufficiently fluid to flow back from bearing surfaces, from which it has once been wiped or squeezed away.

While oils are easy to propel at moderate temperatures, none has heretofore been available that is very well suited as a chassis lubricant. Many ordinary lubricating oils, such as motor oils flow readily at ordinary temperatures yet they change from a fluid to a solid at temperatures only a little below 32° F. Winter oils which stay fluid at lower temperatures, are far too fluid at ordinary temperatures. Various other viscous oils stiffen at temperatures well above those usual in winter and so cannot be propelled through long pipes and highly restricted outlets except by inconveniently high pressures.

For chassis lubrication, it is desirable to employ an oil which does not become too viscous in the cold and yet has sufficient body at the higher temperatures of use to serve as a cushion in order to eliminate any tendency to rattle in shackles, arising from side sway of the vehicle or looseness of the parts; also sufficiently viscous to remain in the bearings under load and so prevent metallic contact and wear and to exclude water, dust or other deleterious material.

To preserve the unbroken film and thus prevent bearing wear and effectively to cushion parts like shackles, oil should preferably have a viscosity in the neighborhood of 1500 to 3500 S. U. V. (as measured by the Saybolt Universal viscosimeter) at 100 degrees F. With regard to fluidity, such oil should remain sufficiently liquid to move at reasonable speed and ease through pipes having highly restricted outlets especially when these are at the terminals of long small-bore pipes and even when the temperature is at or below zero degrees F. the delivery should be at a rate sufficient to meet the lubricating requirements.

To prevent disturbance in the system due to solid particles carried with the oil, it is desirable to pass the latter through a dense filter before it enters the line. However, oils, the viscosity of which has been raised by the addition of small percentages of various soaps, are not adapted to such treatment, because on the one hand, the filter would rapidly become clogged with the soap and on the other, the oil would be rendered too fluid after the soap has thus been abstracted.

In highly developed chassis lubricating systems for relatively complicated automobile structures, there are certain tail lines not subjected to propulsive pressure, but through which the oil proceeds by gravity flow to the bearings. Accordingly, the oil must have sufficient fluidity even at low temperatures to advance by gravity flow through such tail lines. Moreover, in certain types of such lubricating systems, involving a propulsive pump which draws its charge by suction, the oil must have sufficient fluidity to advance into the pump under the limited suction impulse. In such lubricating systems, as previously noted, highly restricted outlet fittings or drip plugs, (such as present elongated crevices in the order of .001" in thickness) must not clog in the cold under the propulsive pressures available.

Aside from the question of viscosity, ordinary mineral oil fed intermittently is ineffective to prevent rusting of steel bolts in the bearings. When the chassis is driven in rain or over wet roads, mud and water have a tendency to creep into the bearings and to push aside the oil or to find its way into those parts of the crevice, from which the oil has receded. Bolts partly wet with water may thus become rusty.

An object of the invention is to provide a chassis lubricant free from grease or suspended matter of any kind which would clog a dense filter, and which is capable of being propelled, under moderate pressure, even in the cold of winter climates, through long pipes of small bore, having drip plug outlets, and is yet not too fluid at high temperatures to serve as a satisfactory chassis lubricant.

Among other objects are, to provide a lubricating oil, of relatively low cost, having sufficient body not to be readily washed away from the bearing surface or to leak therefrom, forming an oil film of sufficient thickness to satisfactorily support the heavy load at the chassis bearings and of sufficient tenacity to form a satisfactory oil seal against the entry of dirt, dust, mud, grit or water.

These objects are accomplished by the mixture of a mineral oil with a suitable non-drying or semi-drying fixed or fatty oil, preferably a vegetable oil in special ranges of proportions. The mineral oil is preferably a vacuum distilled bright-stock petroleum oil of low carbon residue and low pour test made from asphaltic crudes and free from paraffin.

Another object is to provide a test especially suitable for ascertaining the fitness of an oil as a chassis lubricant, which test can be performed with the simplest of apparatus, without skillful manipulation, and in a minimum of time.

In the accompanying drawing relating to my novel test,

Figure 1:
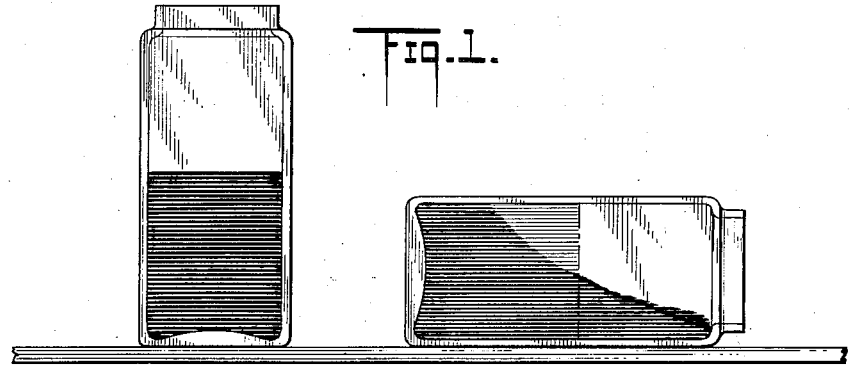
Fig. 1 is a diagrammatic view indicating my manner of testing an oil.

Preferably I employ a heavy-body oil mixture made from asphaltic crudes free from paraffin, of low carbon residue, and having at 100 degrees F. a viscosity of approximately 2500 S. U. V.

While at moderate temperatures, the oil just specified has the required properties for chassis lubrication, the viscosity thereof rises rapidly with decrease in temperature. At low temperatures well above zero degrees F. the oil becomes viscous like tar and could not then be propelled through the highly restricted drip plugs provided as flow distributors on a chassis, unless the propulsive pressure were raised to impracticable intensities.

These objections have been overcome by the addition of rape seed oil, preferably blown rape seed oil or similar fixed or fatty oil, as hereinafter more specifically set forth. The blown rape seed oil employed is thick and syrupy at ordinary temperatures and may be considerably thicker than the mineral oil above specified, with a viscosity at 100° F. as high as 5500 S. U. V., although such oil of lower viscosity could be used.

While the viscosity of the composite oil at 100° F. is substantially a compromise between those of its ingredients, a marked and wholly unexpected improvement in fluidity of the mixed oil, occurs under cold. At zero degrees F. the mixture of oils above specified is more than ten times as fluid as would be the unblended mineral oil at such temperatures, and infinitely more fluid than the rape seed oil, the addition of which produces this increase in fluidity of the mineral oil.

While I may use rape seed oil in other proportions I ordinarily prefer the use of between 6 to 15 per cent of rape seed oil, to mineral oil, as will appear more fully from the graph, Fig. 2, and from the description thereof below.

Thus while the mineral oil alone loses its fluidity in cold, as does also the rape seed oil alone, a mixture of these ingredients within the range of proportions set forth, produces a composite oil many times more fluid in the cold than either of the two constituents alone. The A. S. T. M. "cold test" is many times better.

My composite oil has a cold test far lower than that of either of its ingredients. The rape seed oil in my compound appears to act at low temperatures, as a lubricant for reducing the friction between the molecules of the mineral oil base.

Aside from the remarkable advantage of preventing excessive rise in viscosity of the mineral oil with drop in temperature, the added rape seed oil has the additional virtue that it renders the oil emulsible, so that such lubricant will not draw away from a bearing previously wet with water.

The composite oil is sufficiently fluid even in the cold to flow through gravity pipes in the absence of positively applied pressure and at such temperatures will also flow into a pump under suction thereof.

The oil, moreover, has no solid or greasy ingredients, is free from acid or other corrosive materials and has no volatile components. The proportion of the relatively expensive rape seed oil is so small that the cost of the composite oil is not much greater than that of plain mineral oil.

Thus, I have provided an oil of high viscosity, and low cold test which will readily pass through filters even at low temperatures and which will be satisfactory from one extreme to the other of the temperature to which oil is subjected, say from zero degrees F. at exposed chassis lines in cold winter weather to 180° F. existing in summer under the engine hood, where the source of oil is usually disposed. The oil will have sufficient viscosity at the highest temperature to meet all of the specifications above outlined and will not have thickened excessively at the lowest temperature.

Though a film of paraffin oil has a lesser shearing resistance at low temperature than one of asphaltic base oil, it is, nevertheless, inferior to the latter as a base for a chassis lubricant. The reason is that paraffin oil becomes a waxy solid at relatively high temperature, about 30° F. and though mixed with rape seed oil, would have certain shortcomings when conditions of operation are most adverse. In extreme cold for instance, such oil might not be readily sucked in, during the intake stroke of a piston pump and lubrication would be inhibited.

Blown rape seed oil is preferred as the other ingredient of my oil, because when compared to most other fixed or fatty oils, it has a low cold test. Other oils producing similar results, for instance blown cotton seed oil, blown peanut oil and blown corn oil, are, however, within the scope of my invention.

Having now described my novel chassis oil, I will proceed to outline my test for ascertaining the suitability of an oil for chassis lubrication.

The only equipment required is a supply of large mouthed square bottles, preferably of four ounces capacity, and a mechanical refrigerator, preferably with an adjustable thermostat to predetermine the temperature. If desired, the bottles may have graduations or a single fixed line (see Fig. 1—bottle lying down) to indicate the level to which they should be filled. The charged bottles are kept in the refrigerator sufficiently long to chill the oil to the temperature for which the thermostat is set, for example, 5° F. The bottles are then quickly turned while still in the refrigerator to lie on their sides, as shown. Observations are then made with the aid of a suitable timepiece of the interval required for the meniscus of the oil in the bottle to reach a definite point, for instance, the rim of the bottle. The samples tested being oils that have sufficient viscosity to meet chassis lubricating requirements, in summer, it is apparent that the tested oil which takes the least time to reach the rim of the bottle is the most satisfactory from the standpoint of fluidity, for it shows the least increase in viscosity under the cold of the refrigerator. At a given temperature of test, I measure the flow period for the meniscus to reach the mouth of the standard bottle in units defined by me as Bijur flow seconds at that temperature.

The Bijur flow second test is a good measure of the relative fluidity of the oil, as far as concerns the facility with which it can be drawn into a pump or propelled through small long pipe lines and/or highly restricted outlets.

Figure 2:
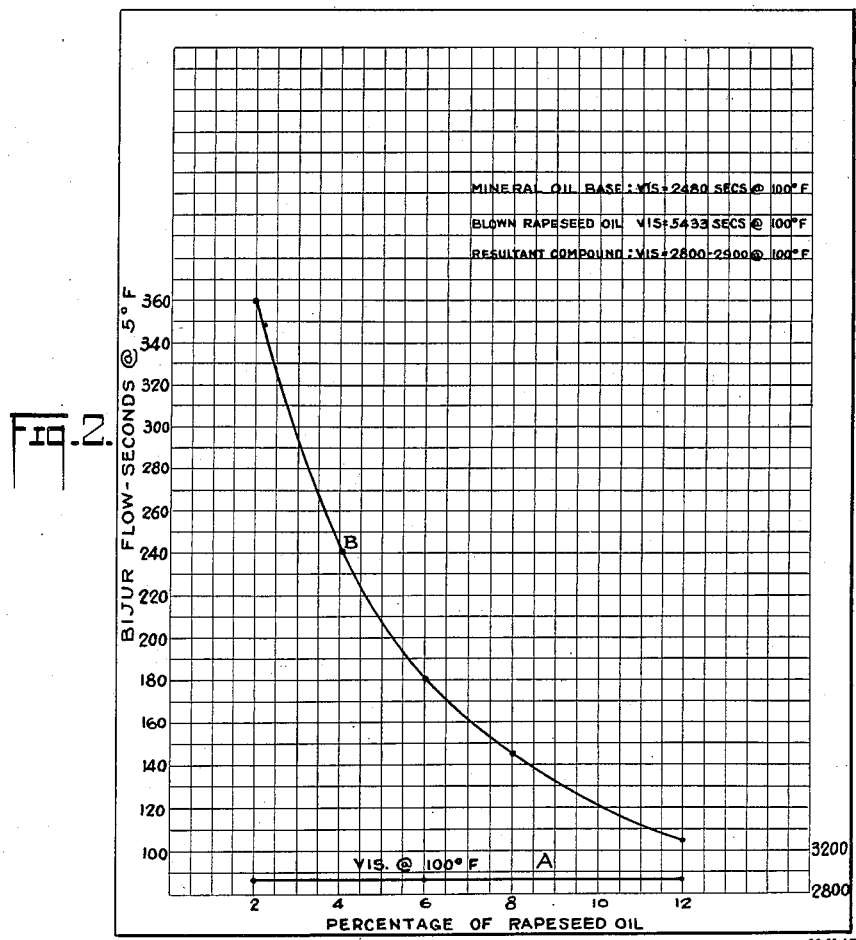
Fig. 2 is a graph indicating the results of a test run.

In Fig. 2, graph A, are plotted observations showing the viscosity measured by S. U. V. of a mixture of mineral oil, as previously specified, of viscosity of 2480 S. U. V. at 100° F. In Fig. 2, graph B, are plotted observations made on the same compound oil, measured in Bijur flow seconds and at 5° F.

The graph shows that while, as indicated in graph A, increasing proportions of the highly viscous rape seed oil, have little or no effect on the fluidity of the compound oil at 100° F., which remains at 2800 to 2900 S. U. V., the increased percentage of rape seed oil causes a rise in the fluidity of the compound oil at 5° F., as measured in Bijur flow seconds, which rise is represented by a smooth curve, closely approximating a hyperbola. For most of the cooler regions in which automobiles are commonly used, a viscosity at 5° F., as high as 160 Bijur flow seconds, is satisfactory and for warmer climates, oil of an even higher viscosity may be used. As the graph shows, 160 Bijur flow seconds at 5° F. corresponds to 6 per cent of blown rape seed oil. In view of the relatively high cost of rape seed oil, it is preferred to use a small percentage thereof, as above suggested, although where greater fluidity in extreme cold, for instance, is desired, a higher percentage of rape seed or equivalent oil, 10, 12, 15 per cent or more may be used.

Having thus described my invention, what I claim as new and desire to secure by Letters Patent is:

1. A chassis lubricating oil comprising a base of petroleum oil made from asphaltic crudes and of viscosity in the order of 3000 S. U. V., having admixed therewith a small percentage of blown rape seed oil.

2. A chassis lubricating oil comprising a vacuum distilled bright stock mineral oil, the product of asphaltic crudes having low carbon residue and low pour test, and having admixed therewith from 6 to 15 per cent of blown rape seed oil.

3. A chassis lubricating oil comprising a vacuum distilled bright stock mineral oil, the product of asphaltic crudes having low carbon content and low pour test, and of viscosity at 100° F. in the order of 3000 S. U. V., and having admixed therewith 6 to 8 per cent blown rape seed oil.

JOSEPH BIJUR.